(12) United States Patent
Konno

(10) Patent No.: US 7,190,255 B2
(45) Date of Patent: Mar. 13, 2007

(54) ANTI-THEFT DEVICE IN MOTORCYCLE

(75) Inventor: Takeshi Konno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 278 days.

(21) Appl. No.: 10/670,992

(22) Filed: Sep. 25, 2003

(65) Prior Publication Data

US 2004/0090307 A1    May 13, 2004

(30) Foreign Application Priority Data

Sep. 26, 2002 (JP) .............................. 2002-281258

(51) Int. Cl.
| | |
|---|---|
| G05B 19/00 | (2006.01) |
| G06F 7/00 | (2006.01) |
| G08B 29/00 | (2006.01) |
| H04B 1/00 | (2006.01) |
| H04Q 9/00 | (2006.01) |

(52) U.S. Cl. .................. 340/5.62; 340/5.64; 340/10.52
(58) Field of Classification Search ............... 340/5.62, 340/5.64, 10.52, 5.7, 426.1, 7.5; 70/252, 70/255, 278.1; 307/10.2, 10.5
See application file for complete search history.

(56) References Cited

U.S. PATENT DOCUMENTS

| | | | | |
|---|---|---|---|---|
| 4,898,010 A | * | 2/1990 | Futami et al. .............. 70/278.1 |
| 5,343,077 A | * | 8/1994 | Yoshida et al. ............. 340/5.64 |
| 5,469,135 A | * | 11/1995 | Solow .................... 340/426.31 |
| 5,561,420 A | * | 10/1996 | Kleefeldt et al. ........... 340/5.26 |
| 5,745,026 A | * | 4/1998 | Kokubu et al. ........... 340/286.01 |
| 5,754,117 A | * | 5/1998 | Inamori et al. .......... 340/825.69 |
| 5,839,081 A | | 11/1998 | Joao et al. |
| 5,982,295 A | * | 11/1999 | Goto et al. ............... 340/10.52 |
| 6,028,507 A | * | 2/2000 | Banks et al. ................. 340/427 |
| 6,040,763 A | * | 3/2000 | Nakajima .................... 340/427 |
| 6,188,140 B1 | * | 2/2001 | Kito et al. .................. 307/10.4 |
| 6,434,983 B1 | | 8/2002 | Perillat et al. |
| 6,525,433 B1 | * | 2/2003 | Enoyoshi et al. ........... 307/10.5 |
| 6,661,350 B1 | * | 12/2003 | Rohrberg et al. ....... 340/825.69 |
| 6,710,700 B1 | * | 3/2004 | Tatsukawa et al. ......... 340/5.53 |

FOREIGN PATENT DOCUMENTS

| | | |
|---|---|---|
| FR | 2759109 | 8/1998 |
| FR | 2802871 | 6/2001 |

* cited by examiner

Primary Examiner—Wendy R. Garber
Assistant Examiner—Nam Nguyen
(74) Attorney, Agent, or Firm—Carrier, Blackman & Associates, P.C.; William D. Blackman; Joseph P. Carrier

(57) ABSTRACT

An anti-theft device for a motorcycle having an associated remote control, prevents accidental misplacement or accidental confinement of the remote control in a locked storage box on the motorcycle. The anti-theft device includes a main switch and a remote control holder integrated with a handlebar locking module. When an unlocking signal is transmitted from the remote control, the locking of a handlebar may be released by a handlebar locking actuator only when the remote control is inserted into the remote control holder, thereby actuating a main relay driving circuit so that power is supplied to electric equipment and the motorcycle's engine can be started.

18 Claims, 6 Drawing Sheets

Fig. 3
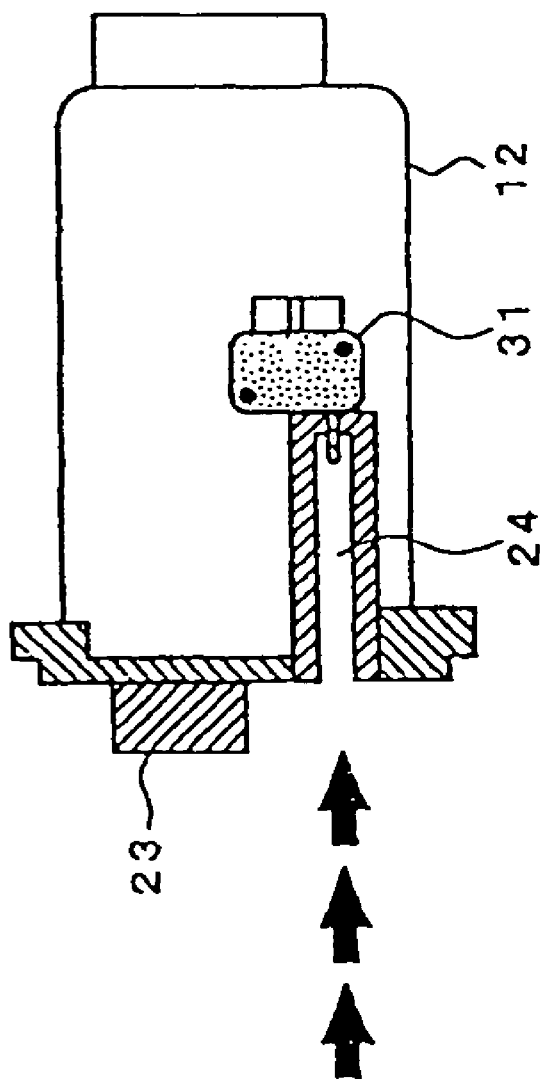
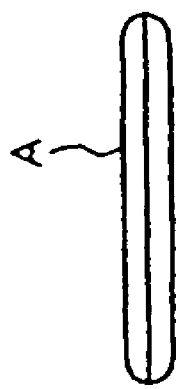

ANTI-THEFT DEVICE IN MOTORCYCLE

BACKGROUND OF THE INVENTION

CROSS-REFERENCE TO RELATED APPLICATIONS

The present application claims priority under 35 U.S.C. 119, based on Japanese patent application No. 2002-281258, filed Sep. 26, 2002.

1. Field of the Invention

The present invention relates to an anti-theft device in a motorcycle of a type wherein the engine may be started using a remote control. More particularly, the present invention relates to such an anti-theft device in which the loss of a remote control can be prevented so that an engine can be started promptly when desired.

2. Description of the Relevant Art

A vehicular anti-theft device in which the starting of an engine is allowed by reception of a control signal transmitted from the outside of a vehicle by a remote control and discriminating the control signal is known.

Japanese published utility model application No. 2558117, for example, disclosed an anti-theft device in which an operation unit and a ten-key keypad are provided on a motorcycle or a three-wheeled vehicle, a card storing a body registration number and a password of an engine ignition switch and a lighting switch is inserted into the operation unit, and when a password is input using the ten key pad the starting of the engine is allowed only if the input password corresponds with the password stored in the card.

Starting of the engine is not allowed if the remote control is not used, or if the card is not used, or if the correct password is not input, thereby preventing theft of a vehicle.

However, in such anti-theft device adopting the remote control, the remote control reception may be lost or distorted because of engine vibration. Additionally, in a scooter-type motorcycle in which locking of a seat, functioning as a cover for a storage box beneath the seat, is released by a remote control, the remote control could be accidentally locked under the seat, preventing the motorcycle from being operated.

Moreover, in the anti-theft device disclosed in the Japanese published utility model application No. 2558117, as a user must insert a card into a card reader unit when the user desires to ride on a motorcycle and further, is required to input a password using a ten-key keypad, a burden is imposed on the user. There are also disadvantages associated with the fact that as it takes time to input the password, an engine cannot be started promptly, and the user may otherwise forget the password and be unable to start the engine.

Although the known devices have some utility for their intended purposes, a need still exists in the art for an improved motorcycle anti-theft device. In particular, there is a need for a motorcycle anti-theft device that allows the motorcycle to be conveniently started with remote control and prevents the locking of a storage housing on the motorcycle if the remote control is contained therein.

SUMMARY OF THE INVENTION

The present invention is made to solve the above-discussed limitations and disadvantages of the conventional device, and an object of the invention is to provide an anti-theft device for a motorcycle of a type wherein the starting of an engine is allowed using a remote control, the anti-theft device preventing loss of the remote control and locking of same in a housing under the seat or the like, so that an authorized user will always be able to promptly start the engine.

According to a first aspect of the present invention, there is provided an anti-theft device for a motorcycle having a receiver that receives an unlocking signal from a remote control and a controller that determines whether ID included in the unlocking signal corresponds with a pre-registered ID in the motorcycle, the anti-theft device comprising: a holder that holds the remote control, and a detector that is provided inside the holder, detects when the remote control is held by the holder and outputs a detection signal when the remote control is held. The controller permits the starting of an engine when the controller determines that ID included in the unlocking signal corresponds with the pre-registered ID and the detection signal is output from the detector.

According to a second aspect of the invention, the holder is adapted to receive the remote control inserted therein.

According to a third aspect of the invention, a cutout is provided in the remote control and the holder includes a fitting part which securely fits into the cutout.

With the first aspect, loss of the remote control and accidental confinement of the remote control in a locked storage box on the motorcycle can be prevented, so that a user will always be able to promptly start the engine.

With to the second aspect, a significant portion or most of the remote control can be inserted into the holder such that the remote control is securely held.

With to the third aspect, the remote control can be more firmly and securely held via the cutout and the fitting part. This is desirable because the vibration in running of a motorcycle is particularly large.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a block diagram showing one embodiment of a handlebar locking module according to the present invention.

DETAILED DESCRIPTION OF THE INVENTION

Figure 1:
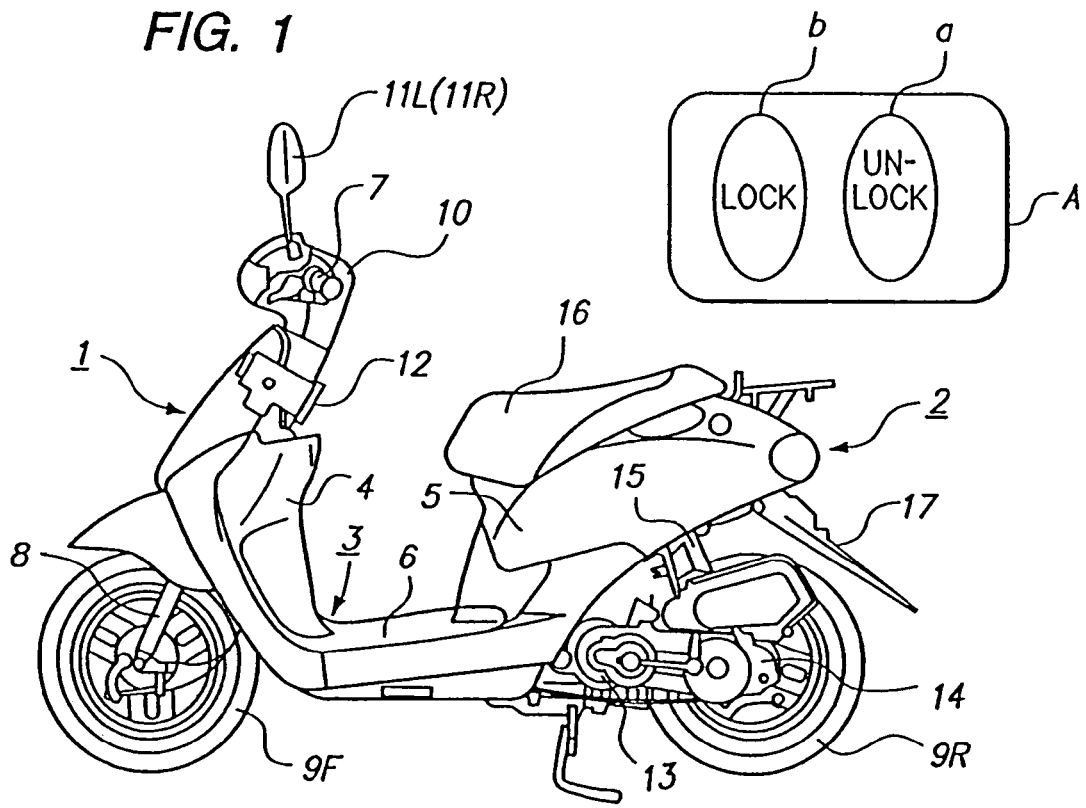
FIG. 1 is a side view showing a scooter-type motorcycle and an associated remote control to which an anti-theft device according to the invention is applied.

Referring to the drawings, the present embodiments of the invention will be described in detail below. FIG. 1 is a side view showing a scooter-type motorcycle and an associated remote control to which an anti-theft device according to the invention is applied. In this drawing, a cover of a handlebar locking module is omitted. As shown in FIG. 1, the front 1 of the body and the rear 2 of the body are coupled via a low floor 3. The skeleton of the motorcycle is formed by a body frame substantially composed of a down tube and a main pipe (not shown).

The front 1 of the body, the rear 2 of the body and the floor 3 are covered with a front cover 4, a body cover 5 and a center cover 6. In the front 1 of the body, a handlebar 7 is provided above a steering head with the handlebar supported by the steering head, a front fork 8 is extended downward and a front wheel 9F is supported at its lower end. An upper part of the handlebar 7 is covered with a handlebar cover 10 that also functions as an instrument panel. The steering head, the front fork 8 and the handlebar 7 form steering mechanism of the motorcycle.

Grips of the handlebar 7 protrude from the handlebar cover 10 in a lateral direction of the body and side mirrors 11L (11R) protrude upward. In relation to the steering mechanism, the handlebar locking module 12 for locking the handlebar 7 is provided. The handlebar locking module 12 will be described further in detail later.

A fuel tank and a housing or storage box provided with the motorcycle are supported by the main pipe inside the body cover 5. An engine, such as a single-cylinder four-cycle engine, is mounted on the motorcycle via a swing unit. A belt-type continuously variable transmission 13 is arranged at the back of the engine and a rear wheel 9R is supported by a speed reducing mechanism 14 provided at the back of the continuously variable transmission via a centrifugal clutch. A rear cushion or damper 15 is inserted between the upper end of the speed reducing mechanism 14 and the main pipe.

A seat 16 is provided above the body cover 5 with the seat covering the housing box. The seat 16 can be lifted and the housing box below the seat can house a helmet and other objects. A number plate fixture 17, loading space and a tail lamp are provided at the rear of the body cover 5. An intake pipe, a carburetor and an air cleaner are also arranged in connection with the engine, however, they are not shown in FIG. 1.

Figure 2:
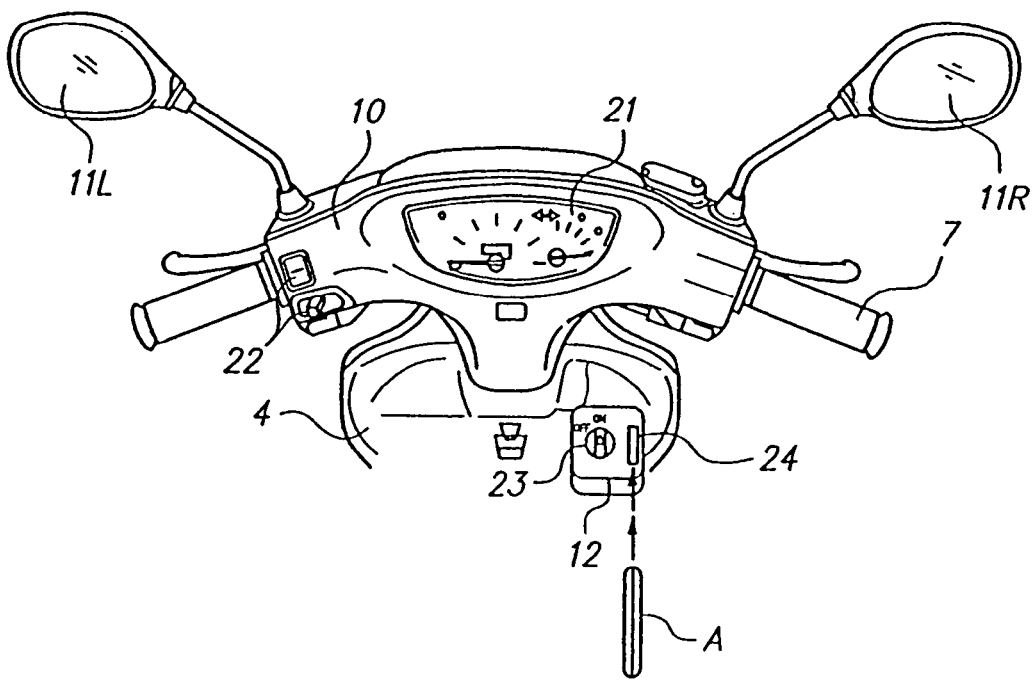
FIG. 2 is a front view of a portion of the motorcycle of FIG. 1 showing the configuration in the vicinity of a handlebar cover.

FIG. 2 is a front view showing the configuration of a portion of the motorcycle in the vicinity of the handlebar cover 10 shown in FIG. 1 that also functions as the instrument panel. The instrument panel including a speedometer 21 and switches 22 for a light and a winker are arranged on the handlebar cover 10, the grips of the handlebar 10 protrude in the lateral direction of the body and the side mirrors 11L, 11R protrude upward.

The front panel of the handlebar locking module 12 is located outside an inner part of the front cover 4, and a main switch 23 and a remote control unit holder 24 are integrated here. The remote control unit holder 24 (hereinafter also called a holder) is configured so that a remote control unit A (hereinafter also called a remote control key or a remote control) may be inserted and held. The remote control unit holder 24 is in a shape of an elongated slit (e.g. a slot or a opening) into/from which more than half of an elongated portion of the remote control key A, generally having an enlongated shape, is inserted/extracted, as shown in FIG. 3, for example. It will be understood from FIG. 3 that the elongated opening of the remote control unit holder 24 securely and immobilizingly holds and encloses (surrounds) a substantial portion of the remote control unit A therein thereby providing protection to the remote control unit from wind, rain. roadside material. etc.

The remote control key A is provided with an unlocking button a, and a locking button b, as shown in FIG. 1 and includes an electronic circuit for transmitting a locking signal or an unlocking signal including specific ID whenever either button is pressed, and a battery.

FIG. 3 is a block diagram showing one embodiment of the handlebar locking module 12. The handlebar locking module 12 includes the remote control holder 24, a controller, a handlebar locking actuator and a handlebar locking mechanism. However, in FIG. 3, only the internal structure of the remote control holder 24 is shown.

At the front of the handlebar locking module 12, the main switch 23 and the remote control holder 24 are arranged and a remote control setting detection switch 31 for detecting when the remote control key A is inserted into or held by the remote control holder 24 is provided inside the remote control holder 24.

Figure 4:
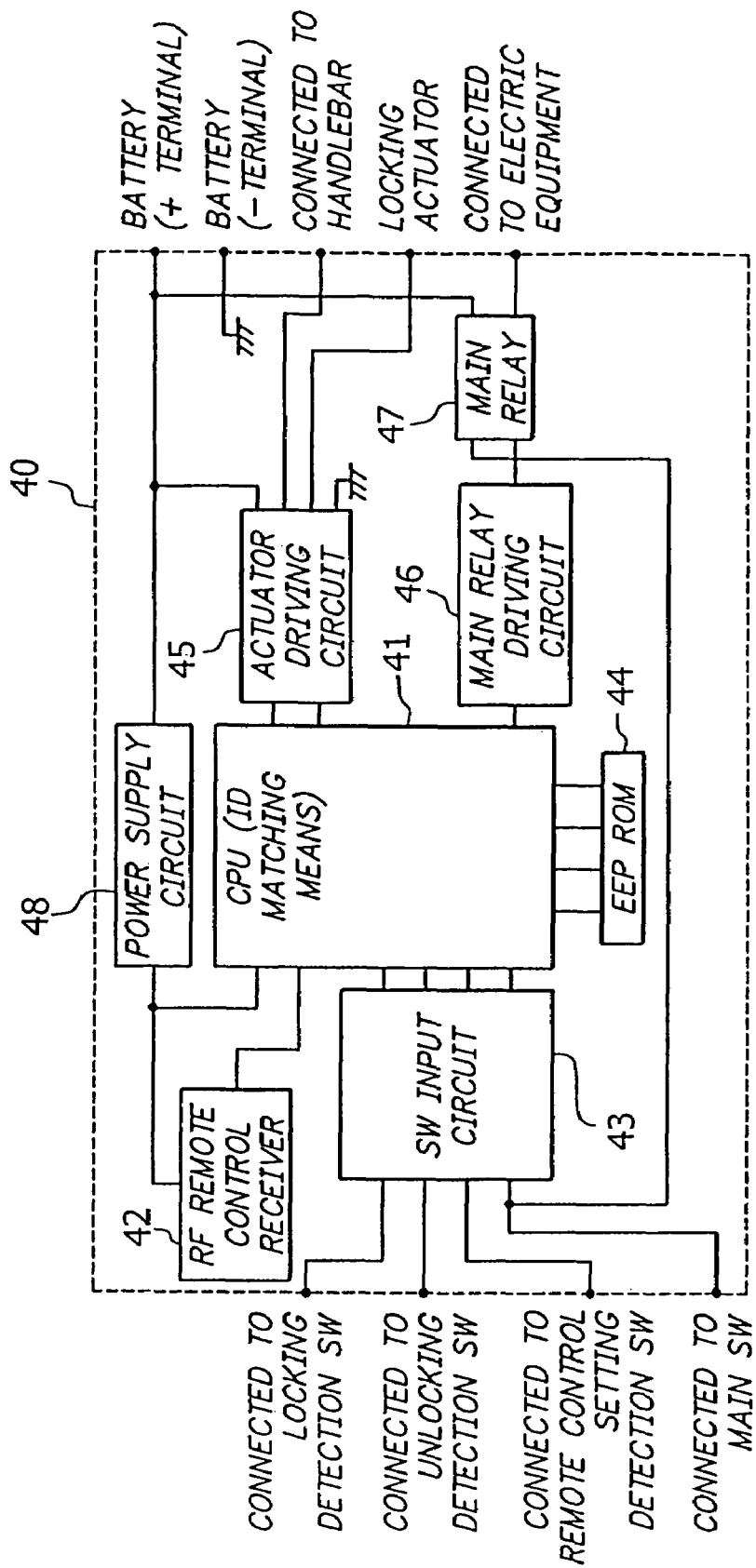
FIG. 4 is a block circuit diagram showing one embodiment of a controller according to the present invention.

FIG. 4 is a block circuit diagram showing one example of the controller built in the handlebar locking module 12. The controller 40 includes CPU 41 as a control device, an RF remote control receiver 42 that receives a locking signal or an unlocking signal transmitted from the remote control key A, a switch input circuit 43 for inputting detection by a locking detection switch, an unlocking detection switch, the remote control setting detection switch 31 and the main switch 23 operatively connected to CPU 41, storage means 44 such as EEPROM that stores registered ID, an actuator driving circuit 45, a main relay driving circuit 46, a main relay 47 and a power supply circuit 48 that supplies power from the battery to CPU 41 and the RF remote control receiver 42.

The actuator driving circuit 45 drives the handlebar locking actuator in case CPU 41 judges that ID included in an unlocking signal transmitted from the remote control key A is coincident with the pre-registered ID and releases the locking of the handlebar. The main relay driving circuit 46 is operated in case CPU 41 judges that ID included in an unlocking signal transmitted from the remote control key A is coincident with the pre-registered ID and a detection signal is output from the remote control setting detection switch 31. The main relay 47 is driven in case the main relay driving circuit 46 is operated and the main switch 23 is turned on, supplies power to electric equipment including an igniter and enables the starting of the engine.

Figure 5:
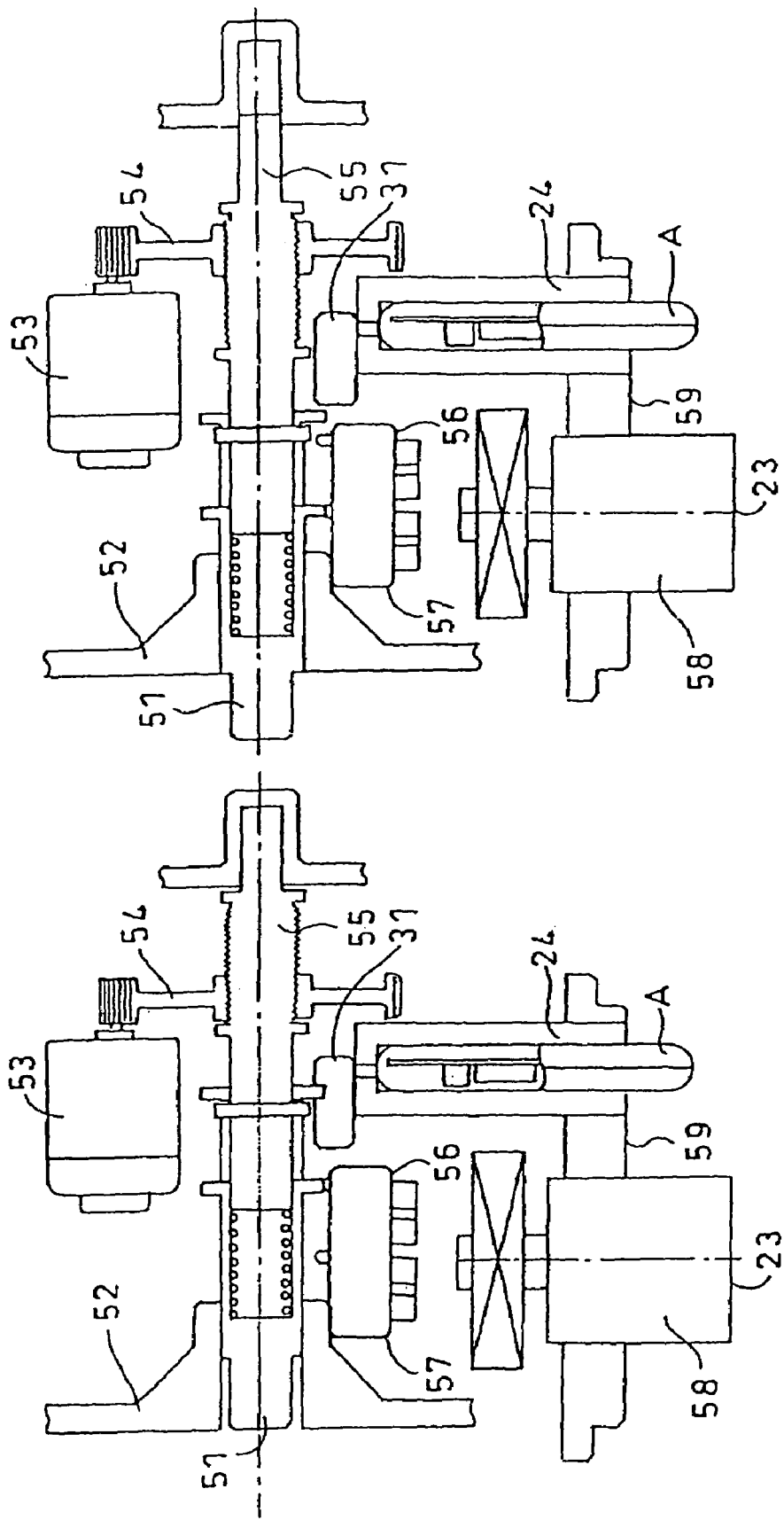
FIGS. 5(a) and 5(b) are schematic diagrams showing one embodiment of a handlebar locking mechanism and a handlebar locking actuator according to the present invention.

FIGS. 5(*a*) and 5(*b*) are schematic diagrams showing one embodiment of the handlebar locking actuator and a handlebar locking mechanism built in the handlebar locking module 12, FIG. 5(*a*) showing a state in which the locking of the handlebar is released and FIG. 5(*b*) showing a state in which the handlebar is locked. When the end of a lock pin 51 is not protruded from an attachment to a frame 52 as in FIG. 5(*a*), this indicates a handlebar locking released state, and when the end of the lock pin is protruded as in FIG. 5(*b*), this indicates a handlebar locked state.

When a motor 53, as the handlebar locking actuator, is rotated, the lock pin 51 is driven laterally in FIGS. 5(*a*), 5(*b*) via a ring gear 54 and an inner gear 55, which respectively form a speed reducing mechanism. When the lock pin 51 is released, an unlocking detection switch 56 is operated by a protruding piece on the pin, and in a locked state, a locking detection switch 57 is similarly operated. Detection by these detection switches 56, 57 is input to CPU 41 shown in FIG. 4 to signal that the handlebar is locked.

FIGS. 5(*a*), 5(*b*) also show the main switch 23 operated with a knob 58 and the remote control holder 24 in a state in which the remote control key A is inserted and the remote control setting switch 31 is turned on. These components are arranged on the front panel 59 of the handlebar locking module.

Next, the operation of the anti-theft device provided with the handlebar locking module 12 will be described. Suppose that the vehicle is stopped, the handlebar 7 is locked by the protrusion of the lock pin 51, the main relay 47 is turned off and no power is supplied to the electric equipment such as the igniter. When in this state, a user presses the unlocking button a of the remote control key A, and an unlocking signal including specific ID is transmitted from the remote control key A.

The unlocking signal is received by the RF remote control receiver 42 and is input to CPU 41. CPU 41 matches ID included in the input unlocking signal and the pre-registered ID stored in the storage means 44, operates the actuator driving circuit 45 and drives the motor 53 in case CPU judges that both IDs are coincident and makes the protruded lock pin 51 draw back. Hereby, the locking of the handlebar is released and detection by the unlocking detection switch 56 is input to CPU 41 via the switch input circuit 43.

Next, when the user inserts the remote control key A into the remote control holder 24, the remote control setting detection switch 31 detects it and an insertion detection signal is input to CPU 41 via the switch input circuit 43. Hereby, the main relay driving circuit 46 is operated, and when the main switch 23 is turned on in this state, the main relay 47 is driven, power is supplied to the electric equipment including the igniter and the starting of the engine is enabled.

While the vehicle is driven, the remote control key A is held in a state in which the remote control is inserted into the remote control holder 24, whereby there is no fear that the remote control key A can be lost. Inasmuch as the remote control is held by the holder, there is also no fear that the remote control can be accidentally confined in the housing box. As shown, neither the holder nor the remote control unit A includes moving Darts for immobilizing the remote control unit within the holder to prevent the remote control unit accidentally falling out of from the remote control unit holder, when it is placed in the remote control unit holder In other words, when the remote control unit holder slidingly receives the remote control unit therein operative engagement between surfaces of the elongated opening of the remote control unit holder and the remote control unit having elongated shape, exclusively retains the remote control unit in the remote control unit holder. Further, as the starting of the engine is enabled immediately when the insertion of the remote control key A into the remote control holder 24 is detected by the remote control setting detection switch 31, it does not take much time to start the engine.

When the engine is stopped, first, the main switch 23 is turned off, the remote control key A is pulled out of the remote control holder 24 and the locking button b is pressed. When a locking signal is transmitted from the remote control key A and is received by the controller 40 of the handlebar locking module 12, the motor 53 is rotated in a reverse direction, the lack pin 51 is protruded, and the vehicle is then in a state in which the handlebar is locked and locking is completed.

Figure 6:
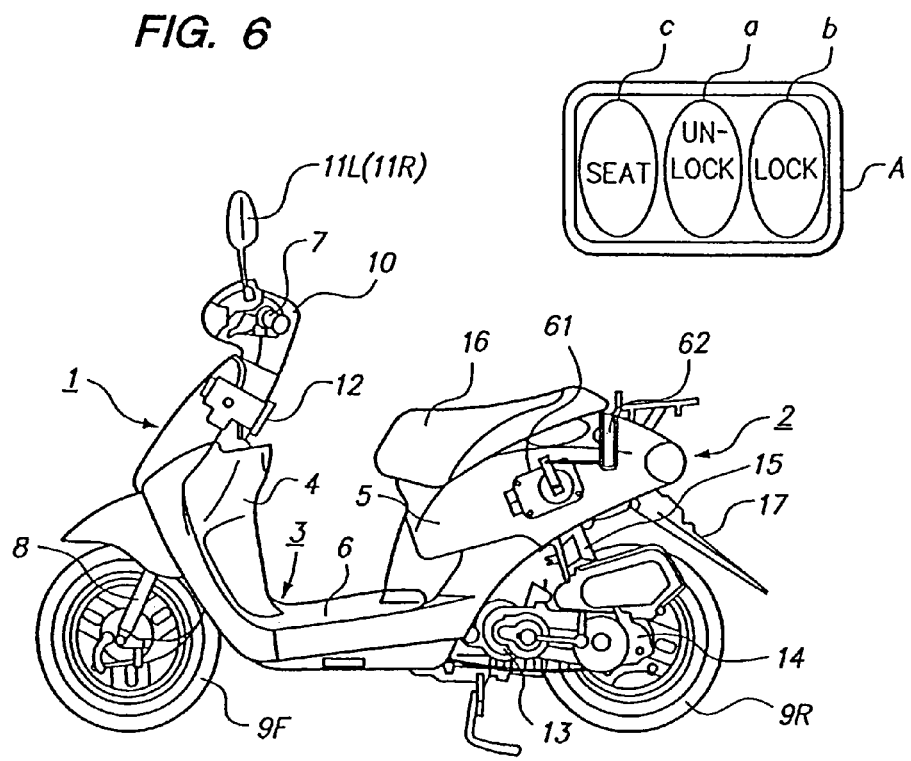
FIG. 6 is a side view showing another scooter-type motorcycle and associated remote control to which the invention can be applied.

FIG. 6 is a side view showing another scooter-type motorcycle and an associated remote control in which a seat opening button c is further provided to a remote control key A. Locking of a seat 16 is released by pressing the button c so that the seat may be moved and an object can be put/extracted in/from a housing box beneath the seat. The anti-theft device according to the invention can be also applied to such a scooter-type motorcycle. The same reference number is allocated to the same part or the similar part as/to the part shown in FIG. 1.

Operation in case an unlocking button a and a locking button b of the remote control key A are pressed is similar to the operation in the above-mentioned embodiment. When the seat opening button c is pressed, a seat opening signal is transmitted from the remote control key A.

When this signal is received by a controller in a handlebar locking module 12 and ID included in the received signal is coincident with the registered ID, a seat actuator 61 is driven, the locking of the seat by a seat catch 62 is released, the seat 16 can be lifted and an object can be put/extracted in/from the housing box below the seat. As the remote control key A is held in the remote control holder 24 when the vehicle is driven, a possibility of having the remote control key accidentally confined in the housing box is reduced.

Figure 7:
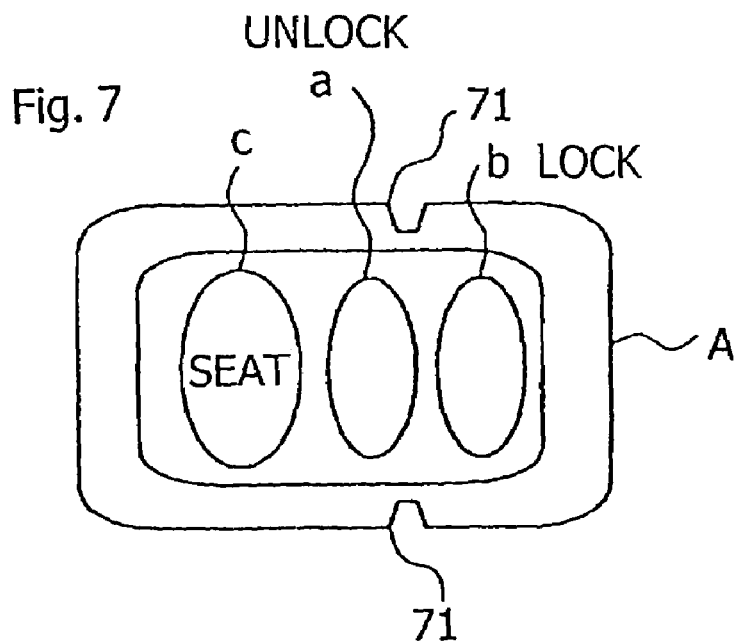
FIG. 7 shows a modified embodiment of a remote control according to the present invention.

The embodiments of the invention have been described above. However, various modifications may be made thereto within the context of the invention. FIG. 7, for example, shows a modified embodiment in which a cutout 71 is provided in a remote control A and a fitting part which fits into the cutout 71 is provided in a remote control holder 24 of a handlebar locking module 12. According to the modification, the remote control key A is more firmly held in the remote control holder 24. FIG. 7, like FIG. 6, shows an example in which the remote control key A is provided with a seat opening button c in addition to an unlocking button a and a locking button b. Of course, an alternative arrangement of the cutout in the holder and the fitting part with the remote control could be provided according to the invention.

Figure 8:
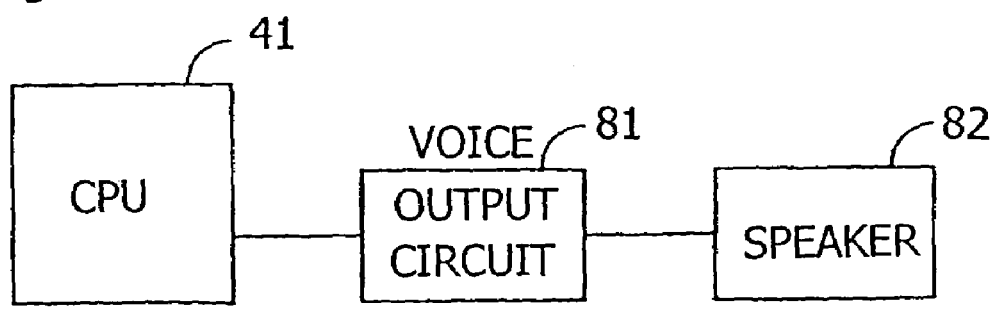
FIG. 8 is a block diagram showing a modified embodiment of a controller of the anti-theft device according to the present invention, in which extraction of the remote control from the holder is audibly indicated to the user.

FIG. 8 shows a modified embodiment of a controller of the anti-theft device, in which a voice output circuit 81 and a speaker 82 are connected to CPU 41, so that an audible may be output from the speaker 82 for fixed time after a remote control setting detection switch 31 is turned off, and according to this configuration, a user can be positively informed of the extraction of a remote control key A.

A remote control holder 24 can be provided at any suitable location of the body. However, if the remote control holder is integrated with a handlebar locking module 12 as in the above-mentioned embodiment, the cost and size of the anti-theft device can be reduced, and the remote control holder can be mounted without any change of a mounted part of the body, or with a minimum change.

For the remote control setting detection switch 31, a contact type switch is shown, however, a magnetic switch such as a reed switch, Hall element and MR element, a capacitance type proximity switch and a proximity switch such as an optical (an infrared ray) sensor can be also used.

As clear from the above description, according to the invention, as the remote control is required to be inserted and held into/in the holder to start the engine, the loss of the remote control and the confinement in the housing box can be largely or entirely prevented, and while the motorcycle is being operated, the remote control cannot be improperly operated.

Besides, if the remote control is inserted into the holder, the engine can be immediately started after an unlocking signal is transmitted, whereby the ease of starting the engine can be enhanced.

Further, when the cutout is provided on the remote control and the fitting part is provided with the holder, the remote control can be more firmly held by the holder, and this configuration is useful to securely hold the remote control in a motorcycle the vibration of operation is particularly large.

Although the present invention has been described herein with respect to a limited number of present embodiments, the foregoing description is intended to be illustrative, and not restrictive. Those skilled in the art will realize that many modifications of the present embodiments could made which would be operable within the spirit and essence of the invention. All such modifications, which are within the scope of the claims, are intended to be within the scope and spirit of the present invention.

Having thus, described the invention, what is claimed is:

1. An anti-theft device in a motorcycle having
a receiver that receives a release signal from a remote control unit and
a controller that judges whether ID included in the release signal is coincident with a pre-registered ID, the anti-theft device comprising:
the remote control unit having an electronic transmitter for transmitting the release signal including a specific ID;
a remote control unit holder provided with the motorcycle, said holder having an elongated slit which holds and encloses at least half of the elongated portion of the remote control unit therein; and
a detector provided with the holder; wherein
the detector detects when the remote control unit is held by the holder and the detector outputs a detection signal when the remote control unit is held;
the controller permits staffing of an engine of the motorcycle when the controller judges that the specific ID included in the release signal is coincident with the pre-registered ID and when the controller receives the detection signal from the detector;
wherein the remote control unit further includes a seat opening button for transmitting a seat opening signal having a specific ID to the controller and the controller permits opening of a seat of the motorcycle when the specific ID included in the seat opening signal coincides with a pre-registered ID.

2. An anti-theft device in a motorcycle according to claim 1, wherein: the remote control unit holder is adapted to securely receive at least half of the elongated portion of the remote control unit therein such that the remote control unit does not fall out of the holder during travel.

3. An anti-theft device in a motorcycle according to claim 1, wherein: one of the remote control unit and the remote control unit holder includes a cutout; and the other of the remote control unit and the remote control unit holder include a fitting part which securely fits into the cutout when the remote control unit is held by the remote control unit holder.

4. An anti-theft device in a motorcycle according to claim 3, wherein: engagement between the fitting part and the cutout assists to securely maintain the remote control unit in the remote control unit holder while the motorcycle is running.

5. An anti-theft device in a motorcycle according to claim 1, wherein: the elongated slit of the remote control unit holder is adapted to receive most of the remote control unit therein.

6. An anti-theft device in a motorcycle according to claim 1, further includes an instrument panel and the remote control unit holder is disposed on a front portion of the instrument panel.

7. An anti-theft device in a motorcycle according to claim 1, wherein: the controller permits running of the engine when the controller judges that the ID included in the release signal is coincident with the pre-registered ID and continues to receive the detection signal from the detector.

8. An anti-theft device in a motorcycle according to claim 1, wherein the anti-theft device is operatively associated with a steering handle locking mechanism or a seat locking mechanism of the motorcycle.

9. An anti-theft device in a motorcycle according to claim 1, wherein the anti-theft device is operatively associated with both a steering handle locking mechanism and a seat locking mechanism of the motorcycle.

10. An anti-theft device in a motorcycle according to claim 9 wherein the remote control unit holder is provided in the vicinity of the steering handle locking mechanism.

11. An anti-theft device in a motorcycle according to claim 1, further including a mechanism for providing an audible indication when the remote control unit is extracted from the remote control unit holder.

12. An anti-theft device for a motorcycle, the anti-theft device comprising:
a remote control unit for transmitting an unlocking signal having a specific ID;
a receiver for receiving the unlocking signal;
a controller for judging the unlocking signal and for permitting staffing of an engine of the motorcycle;
a remote control unit holder having an elongated recess which immobilizingly retains the remote control unit therein, and the holder is disposed on the motorcycle; and
a detector having a detection switch which detects the remote control unit disposed in the remote control unit holder; wherein
engagement between surfaces of the elongated recess of the remote control unit holder and the remote control unit exclusively retains the remote control unit in the remote control unit holder;
the detector outputs a detection signal to the controller when the remote control unit is disposed in the recess of the remote control holder; and
the controller permits staffing of the engine of the motorcycle when the controller judges that the specific ID included in the unlocking signal is coincident with a pre-registered ID and when the controller receives the detection signal from the detector;
wherein the remote control unit includes a locking button, an unlocking button, and a seat opening button.

13. An anti-theft device for a motorcycle according to claim 12, wherein the transmitter transmits an unlocking signal including the specific ID to the controller when the unlocking button is actuated.

14. An anti-theft device for a motorcycle, the anti-theft device comprising:
a handle bar locking module having a remote control unit holder, a detection switch, a controller and a handlebar locking actuator;
a remote control unit having an elongated shape; and
a main switch;
wherein
the remote control unit transmits an unlocking signal having a specific ID when actuated;

the controller receives the unlocking signal and the controller judges whether the specific ID included in the unlocking signal is coincident with a pre-registered ID;

the handlebar locking actuator operates to unlock the handlebar when the IDs are coincident with each other;

the remote control unit holder having an elongated recess which receives and immobilizingly holds a substantial portion of the remote control therein;

the detection switch outputs a detection signal when the remote control unit is placed in the remote control unit holder; and the controller permits starting of an engine of the motorcycle when the controller receives the detection signal from the detector and when the main switch is operated;

wherein the remote control unit includes a locking button, an unlocking button, and a seat opening button.

15. An anti-theft device for a motorcycle according to claim 14, wherein the immobilizingly holding of the remote control unit exclusively involves engagement between surfaces of the elongated opening of the remote control unit holder and the remote control unit having the elongated shape, and wherein the recess encloses a substantial portion the remote control unit.

16. An anti-theft device for a motorcycle according to claim 15, wherein the holding of the remote control unit in the remote control unit holder provides protection to the remote control unit from wind, rain and roadside materials.

17. An anti-theft device for a motorcycle according to claim 14, wherein at least half of the remote control unit is slidingly received in the elongated recess of the remote control unit holder for exclusively retaining the remote control unit therein.

18. An anti-theft device for a motorcycle according to claim 14, wherein the remote control unit is maintained in the remote control unit holder exclusively through engagement of remote control unit with surfaces defining the elongated recess.

* * * * *